United States Patent
Kaneko et al.

(10) Patent No.: US 10,473,401 B2
(45) Date of Patent: Nov. 12, 2019

(54) HEAT EXCHANGER

(71) Applicant: SANDEN HOLDINGS CORPORATION, Isesaki-shi, Gunma (JP)

(72) Inventors: Akira Kaneko, Isesaki (JP); Hirotaka Kado, Isesaki (JP); Yusuke Iino, Isesaki (JP); Tsukasa Ito, Isesaki (JP)

(73) Assignee: SANDEN HOLDINGS CORPORATION, Isesaki-shi, Gunma (JP)

( * ) Notice: Subject to any disclaimer, the term of this patent is extended or adjusted under 35 U.S.C. 154(b) by 159 days.

(21) Appl. No.: 15/746,713

(22) PCT Filed: Jul. 1, 2016

(86) PCT No.: PCT/JP2016/069629
§ 371 (c)(1),
(2) Date: Jan. 22, 2018

(87) PCT Pub. No.: WO2017/018127
PCT Pub. Date: Feb. 2, 2017

(65) Prior Publication Data
US 2018/0216892 A1 Aug. 2, 2018

(30) Foreign Application Priority Data

Jul. 28, 2015 (JP) .................. 2015-148364

(51) Int. Cl.
*F28F 1/02* (2006.01)
*F28D 1/053* (2006.01)
(Continued)

(52) U.S. Cl.
CPC ..... *F28D 1/05341* (2013.01); *B60H 1/00335* (2013.01); *B60H 1/3227* (2013.01);
(Continued)

(58) Field of Classification Search
CPC .. F28F 1/022; F28F 1/025; F28F 9/262; F28F 9/028; F28F 9/182; F28D 1/05383;
(Continued)

(56) References Cited

U.S. PATENT DOCUMENTS

| 2001/0004935 A1* | 6/2001 | Sanada | .................... F25B 39/04 165/110 |
| 2002/0050337 A1* | 5/2002 | Kaspar | .................... F25B 39/04 165/41 |

(Continued)

FOREIGN PATENT DOCUMENTS

| JP | 11-142087 A | 5/1999 |
| JP | 2000-220979 A | 8/2000 |

(Continued)

OTHER PUBLICATIONS

Japan Patent Office, International Search Report issued in International Application No. PCT/JP2016/069629, dated Oct. 4, 2016.

*Primary Examiner* — Devon Russell
(74) *Attorney, Agent, or Firm* — Baker Botts L.L.P.

(57) ABSTRACT

Problem to be Solved
To provide a heat exchanger that can increase the performance by setting an optimal number of tube groups in a configuration where each of the tube groups is provided with headers.
Solution
The number of arrays of tube groups of a core section 2 is set to three rows. The number N of heating medium flow holes 21 per tube is set for each width dimension Tw of tubes 20, and the tubes 20 are formed such that the width dimension Tw of the tubes and a flow channel cross-sectional area S satisfy a relationship of S1≤S≤S2. Therefore, the number of arrays of the tube groups in the core section 2 can be set to an optimal number of arrays for improving the endothermic capacity and reducing the weight, and sufficient refrig-
(Continued)

| TUBE WIDTH Tw [mm] | THE NUMBER OF HOLES (MIN) N | THE NUMBER OF HOLES (MAX) N | FLOW CHANNEL CROSS-SECTIONAL AREA (MIN) S [mm²] | FLOW CHANNEL CROSS-SECTIONAL AREA (MAX) S [mm²] |
|---|---|---|---|---|
| 5.0 | 3 | 4 | 0.889 | 1.797 |
| 6.0 | 4 | 5 | 1.185 | 2.246 |
| 7.0 | 5 | 5 | 1.482 | 2.246 |
| 8.0 | 5 | 6 | 1.482 | 2.695 |
| 9.0 | 6 | 7 | 1.778 | 3.145 |
| 10.0 | 7 | 8 | 2.074 | 3.594 |
| 11.0 | 8 | 9 | 2.371 | 4.043 | erant flow rate and pressure resistance can be secured. As a result, even when there is a restriction on the size of the entire heat exchanger, a light high-performance heat exchanger can be configured. This is significantly advantageous when the heat exchanger is used as an evaporator of a vehicle air conditioning apparatus for which a reduction in the weight of the components and an increase in the performance are demanded.

10 Claims, 17 Drawing Sheets

(51) Int. Cl.
    *F28F 9/18* (2006.01)
    *B60H 1/00* (2006.01)
    *B60H 1/32* (2006.01)
    *F28F 9/02* (2006.01)
    *F28F 9/26* (2006.01)
    *F28D 21/00* (2006.01)

(52) U.S. Cl.
    CPC .......... *F28D 1/05383* (2013.01); *F28F 1/022* (2013.01); *F28F 1/025* (2013.01); *F28F 9/028* (2013.01); *F28F 9/182* (2013.01); *F28F 9/262* (2013.01); *B60H 2001/3286* (2013.01); *F28D 2021/0084* (2013.01); *F28D 2021/0085* (2013.01)

(58) Field of Classification Search
    CPC ..... F28D 2021/0084; F28D 2021/0085; F28D 1/05341
    See application file for complete search history.

(56) References Cited

U.S. PATENT DOCUMENTS

| | | | |
|---|---|---|---|
| 2004/0069477 A1* | 4/2004 | Nishikawa | F28D 1/0391 165/175 |
| 2012/0181007 A1* | 7/2012 | Liu | F28F 1/022 165/177 |
| 2015/0168072 A1* | 6/2015 | Ueno | F24F 13/30 165/144 |
| 2016/0211558 A1* | 7/2016 | Ma | H01M 10/613 |
| 2017/0211892 A1* | 7/2017 | Lim | F28D 1/05383 |

FOREIGN PATENT DOCUMENTS

| | | |
|---|---|---|
| JP | 2001-108391 A | 4/2001 |
| JP | 2005-300135 A | 10/2005 |
| JP | 2012-177546 A | 9/2012 |
| JP | 2015-055408 A | 3/2015 |
| WO | 2002/042706 A1 | 5/2002 |
| WO | 2014/189112 A1 | 5/2014 |

* cited by examiner (a)

(b)

(a)

(b)

(a)          (b)

| TUBE WIDTH Tw [mm] | THE NUMBER OF HOLES (MIN) N | THE NUMBER OF HOLES (MAX) N | FLOW CHANNEL CROSS-SECTIONAL AREA (MIN) S [mm²] | FLOW CHANNEL CROSS-SECTIONAL AREA (MAX) S [mm²] |
|---|---|---|---|---|
| 5.0 | 3 | 4 | 0.889 | 1.797 |
| 6.0 | 4 | 5 | 1.185 | 2.246 |
| 7.0 | 5 | 5 | 1.482 | 2.246 |
| 8.0 | 5 | 6 | 1.482 | 2.695 |
| 9.0 | 6 | 7 | 1.778 | 3.145 |
| 10.0 | 7 | 8 | 2.074 | 3.594 |
| 11.0 | 8 | 9 | 2.371 | 4.043 |

| GAP BETWEEN HEADERS A [mm] | TEST RESULT | EVALUATION OF DRAINAGE |
|---|---|---|
| 0.5 | LIQUID BRIDGE FORMED IN WIDE RANGE | POOR |
| 1.0 | LIQUID BRIDGE FORMED IN NARROW RANGE | LITTLE FAVORABLE |
| 1.5 | LIQUID BRIDGE FORMED IN VERY NARROW RANGE | FAVORABLE |
| 2.0 | LIQUID BRIDGE NOT FORMED | FAVORABLE |

HEAT EXCHANGER

CROSS-REFERENCE TO RELATED APPLICATIONS

This application is a U.S. National Stage patent application under 37 U.S.C. § 371 of International Patent Application No. PCT/JP2016/069629, filed on Jul. 1, 2016, which claims the benefit of Japanese Patent Application No. JP 2015-148364, filed on Jul. 28, 2015, the disclosures of each of which are incorporated herein by reference in their entirety.

TECHNICAL FIELD

The present invention relates to a heat exchanger used as, for example, an evaporator of a vehicle air conditioning apparatus.

BACKGROUND ART

There is a conventionally known heat exchanger of this type, the heat exchanger including: a pair of headers vertically arranged at an interval; a plurality of flat tubes arranged at intervals in a width direction of the heat exchanger, both ends of the tubes connected to peripheral surfaces of the headers respectively; and heat transfer fins provided between the tubes, wherein a heating medium is distributed between the headers through the tubes to exchange the heat of external air flowing outside of the tubes in a front and back direction and the heat of the heating medium in the tubes.

The heat exchanger includes a plurality of tube groups arranged in the front and back direction, and the heating medium sequentially flows from a front tube group to a back tube group through each header. In this case, there is a conventional heat exchanger including tank-like headers provided on each of one end side and the other end side of each tube group (for example, see Patent Literature 1), and there is a conventional heat exchanger including a plurality of core sections arranged in the front and back direction, the core sections including cylindrical headers provided on each of one end side and the other end side of the tube groups (for example, see Patent Literature 2).

CITATION LIST

Patent Literature

Patent Literature 1: Japanese Patent Publication 2005-300135
Patent Literature 2: Japanese Patent Publication 2015-55408

SUMMARY OF INVENTION

Technical Problem

In the former heat exchanger, the headers are made of a plurality of vertically divided members, and the members are bonded by brazing. However, the inside of the headers is partitioned by a plurality of flow channels communicating with tubes of each tube group. Therefore, when there is a bonding failure at a part partitioning the flow channel, the heating medium leaks from between the flow channels in the header. However, the inside of the headers cannot be visually checked from the outside after the completion, and non-destructive inspection of a bonding failure inside of the headers is impossible. Particularly, in a heat exchanger using a carbon dioxide refrigerant as a heating medium, the wall thickness of the headers needs to be increased to obtain a pressure resistance that is about ten times the pressure resistance of a fluorocarbon refrigerant, and there is a problem that this increases the weight and reduces the workability. Furthermore, all of the tubes of the plurality of tube groups arranged in front and back are connected in the headers of the former heat exchanger, and the width in the front and back direction is large. Therefore, condensed water flown down from each tube is easily accumulated on the upper surface of the lower header. As a result, the condensed water accumulated on the upper surface of the lower header may be frozen, and peripheral members may be damaged by the freeze.

On the other hand, cylindrical headers are independently provided on each tube group in the latter heat exchanger, and the condensed water flown down from each tube is discharged from between lower headers. There is an advantage that the condensed water is not accumulated on the lower headers. In a structure including headers on each of a plurality of tube groups as in the latter heat exchanger, there is an advantage that the heat exchange area increases with an increase in the number of tube groups. However, when there is a restriction on the maximum dimension of the entire heat exchanger, the width dimension of each tube becomes small. The flow channel cross-sectional area per tube is reduced, and the flow channels of the heating medium become long. The pressure loss becomes large, and the heat exchange amount is reduced. On the other hand, when the number of tube groups is reduced, the width dimension of each tube becomes large, and the flow channel cross-sectional area per tube also increases. The flow channels of the heating medium become short, and the pressure loss also becomes small. However, when there is a restriction on the maximum dimension of the entire heat exchanger, the increase in the outer diameter of the headers reduces the length of each tube. The flow area of the external air with respect to the tube groups becomes small, and this reduces the heat exchange amount. Therefore, the heat exchange amount varies according to the number of tube groups in the heat exchanger including the headers on each of the tube groups, and it is difficult to set an optimal number of tube groups to obtain the maximum heat exchange amount with a limited overall dimension.

The present invention has been made in view of the problems, and an object of the present invention is to provide a heat exchanger that can increase the performance by setting an optimal number of tube groups in a configuration where each of the tube groups is provided with headers.

Solution to Problem

To attain the object, the present invention provides a heat exchanger including: a pair of cylindrical headers vertically arranged at an interval in a radial direction; and a plurality of flat tubes arranged at intervals in an axial direction of the headers, both ends of each of the tubes being connected to the respective headers, the heat exchanger further including a plurality of tube groups arranged in an air flow direction, the tube groups including the plurality of tubes including the headers at both ends, the heat exchanger exchanging heat of air flowing through a core section formed by the tube groups and heat of a heating medium flowing through a plurality of heating medium flow holes forming flow channels in each of the tubes, wherein three headers and three tube groups are arranged in the air flow direction to form the core section, when a width dimension of the tubes is defined as Tw, a flow channel cross-sectional area per tube is defined as S, and the number of heating medium flow holes per tube is defined as N, the width dimension Tw of the tubes is equal to or greater than 5 mm and equal to or smaller than 11 mm, N is $3 \leq N \leq 5$ when $5 \text{ mm} \leq Tw \leq 6 \text{ mm}$, $4 \leq N \leq 5$ when $6 \text{ mm} < Tw \leq 7 \text{ mm}$, $5 \leq N \leq 6$ when $7 \text{ mm} < Tw \leq 8 \text{ mm}$, $5 \leq N \leq 7$ when $8 \text{ mm} < Tw \leq 9 \text{ mm}$, $6 \leq N \leq 8$ when $9 \text{ mm} < Tw \leq 10 \text{ mm}$, and $7 \leq N \leq 9$ when $10 \text{ mm} < Tw \leq 11 \text{ mm}$, and the width dimension Tw of the tubes and the flow channel cross-sectional area S satisfy a relationship of $-0.002470 \times Tw^5 + 0.09542 \times Tw^4 - 1.436 \times Tw^3 + 10.50 \times Tw^2 - 37.08 \times Tw + 51.31 \leq S \leq 0.005616 \times Tw^5 - 0.2314 \times Tw^4 + 3.746 \times Tw^3 - 29.70 \times Tw^2 + 115.4 \times Tw - 173.9$.

As a result, the number of arrays of the headers and the tube groups of the core section is three rows, and the number N of heating medium flow holes per tube is set for each width dimension Tw of the tubes. The tubes are formed such that the width dimension Tw of the tubes and the flow channel cross-sectional area S satisfy the relationship. Therefore, the number of arrays of the tube groups in the core section can be the optimal number of arrays for improving the endothermic capacity and reducing the weight, and sufficient refrigerant flow rate and pressure resistance can be secured.

Advantageous Effects of Invention

According to the present invention, the number of arrays of the headers and the tube groups in the core section can be the optimal number of arrays for improving the endothermic capacity and reducing the weight, and sufficient refrigerant flow rate and pressure resistance can be secured. Therefore, even when there is a restriction on the size of the entire heat exchanger, a light high-performance heat exchanger can be configured. This is significantly advantageous when the heat exchanger is used as, for example, an evaporator of a vehicle air conditioning apparatus for which a reduction in the weight of the components and an increase in the performance are demanded.

DESCRIPTION OF EMBODIMENTS

Figure 1:
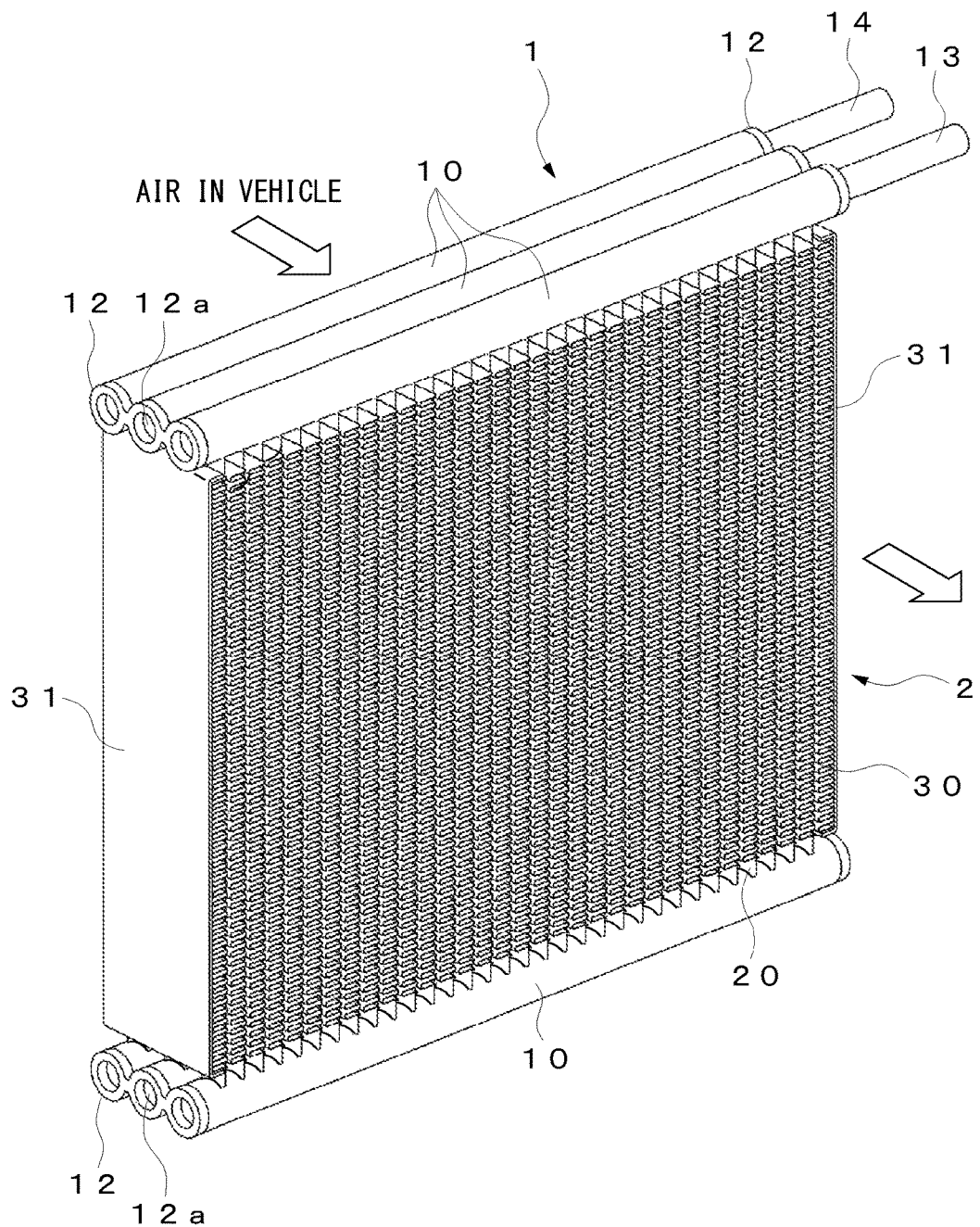
FIG. 1 is a perspective view of a heat exchanger showing an embodiment of the present invention.
Figure 2:
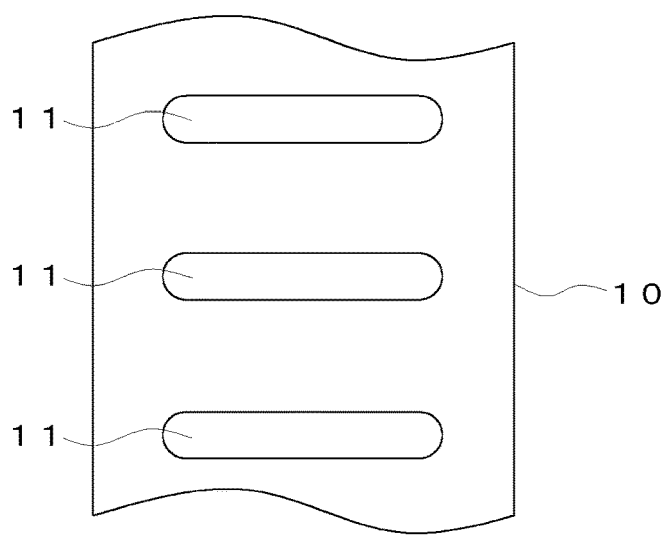
FIG. 2 is a partial side view of a header.
Figure 3:
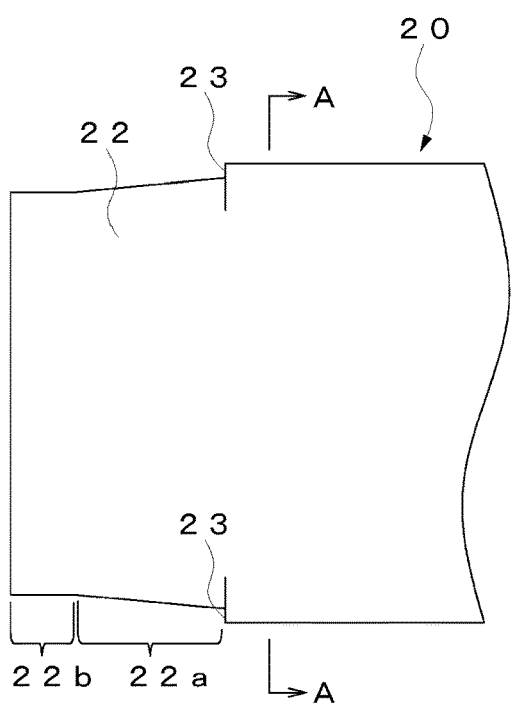
FIG. 3 is a main part plan view of a tube.
Figure 4:
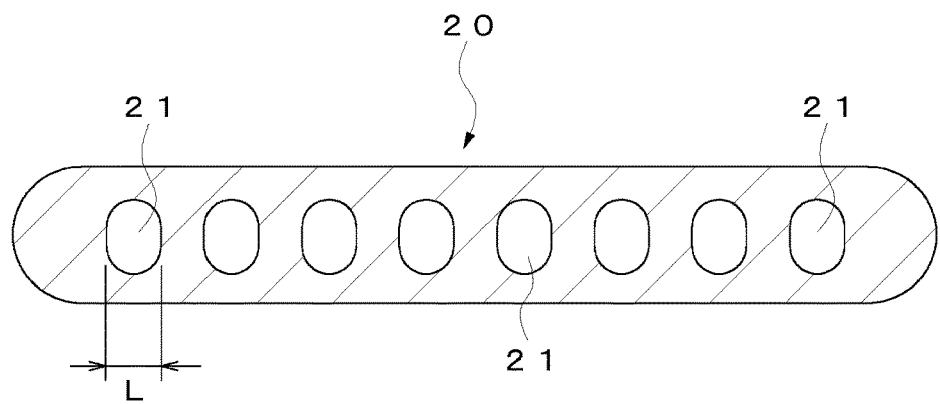
FIG. 4 is a cross-sectional view of the tube taken along A-A arrow line in FIG. 3.
Figure 5:
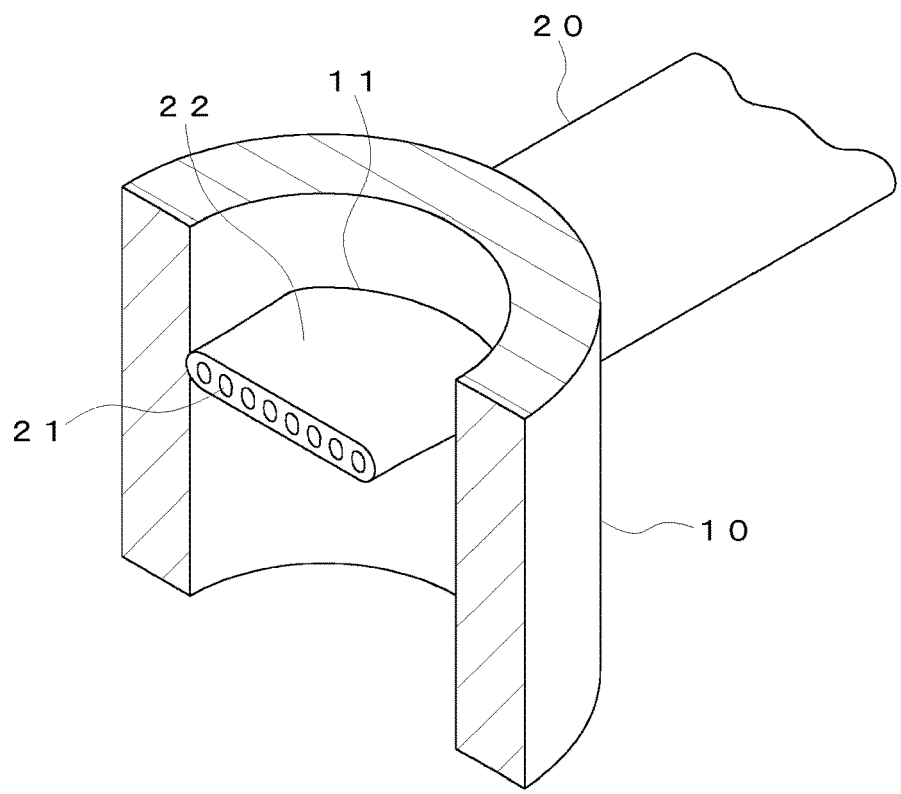
FIG. 5 is a partial cross-sectional perspective view of the header and the tube.
Figure 6:
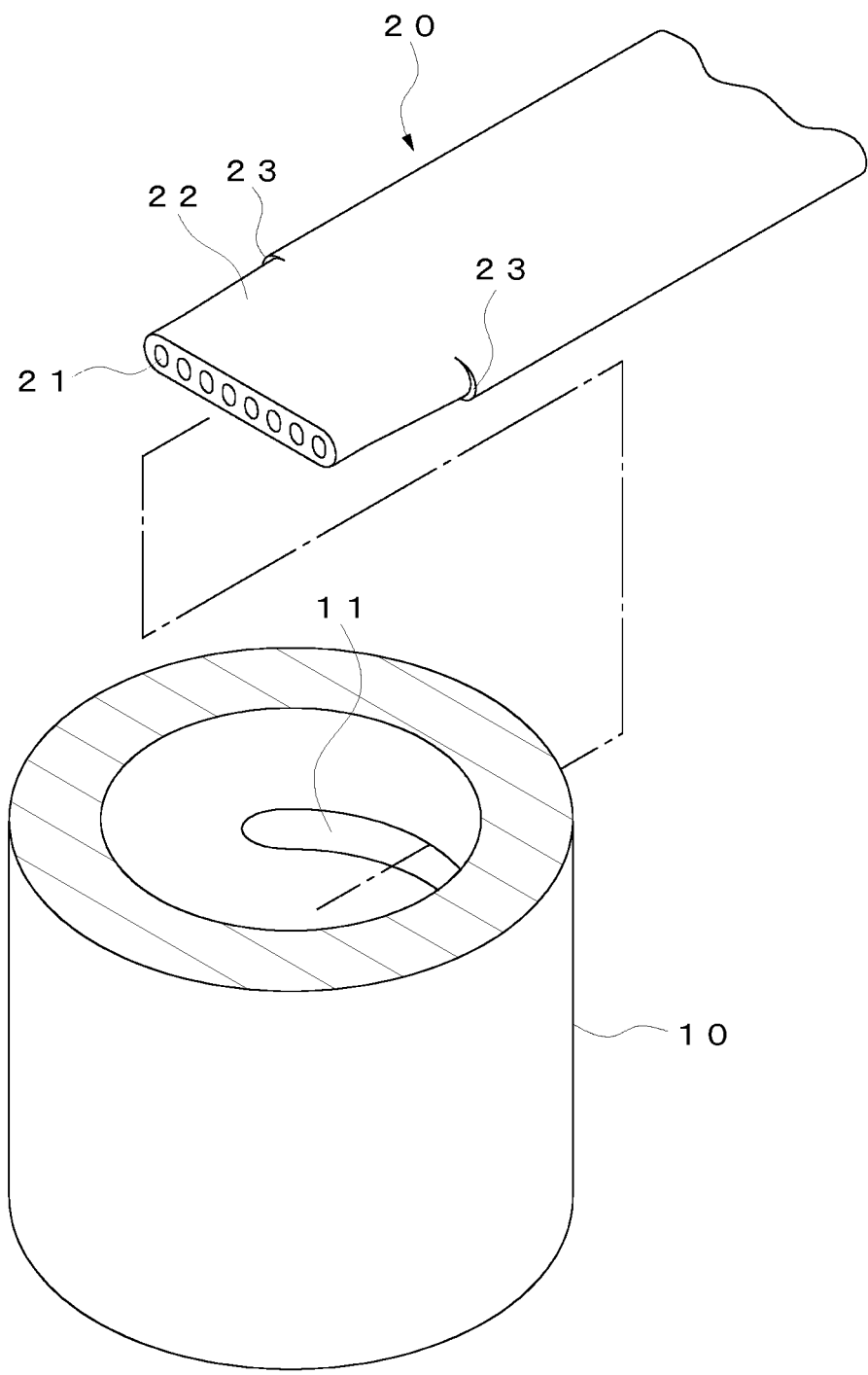
FIG. 6 is a partial cross-sectional exploded perspective view of the header and the tube.
Figure 7:
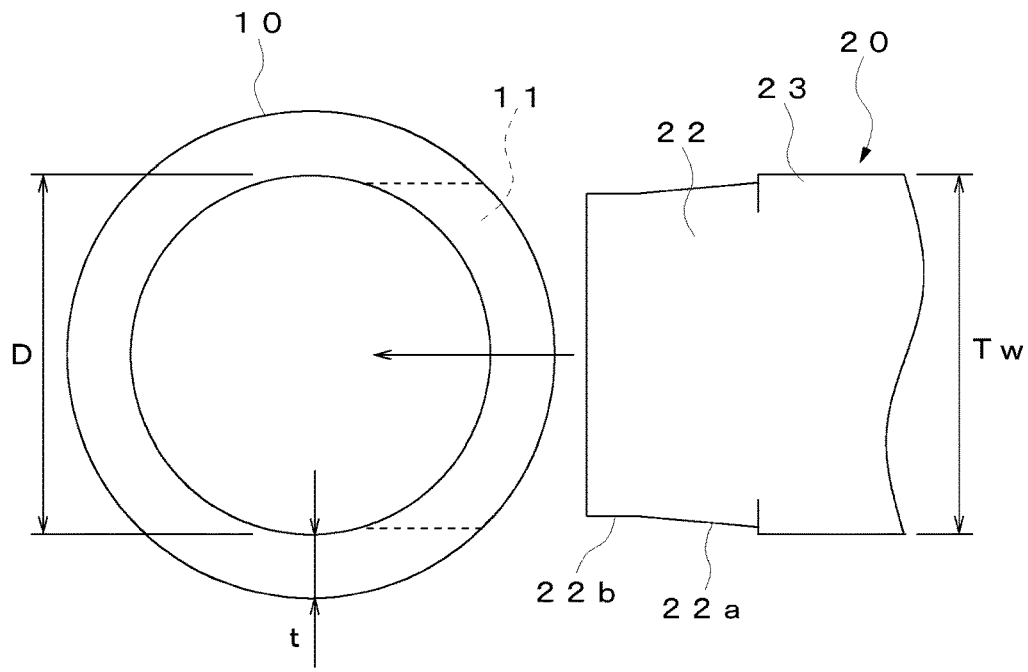
FIG. 7 is a plan view showing a step of inserting the tube into the header.
Figure 8:
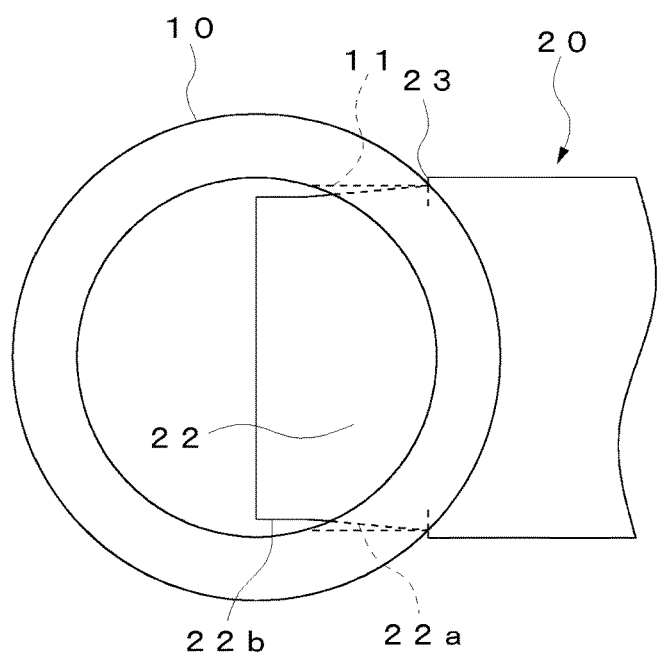
FIG. 8 is a plan view showing a state of the tube inserted into the header.
Figure 9:
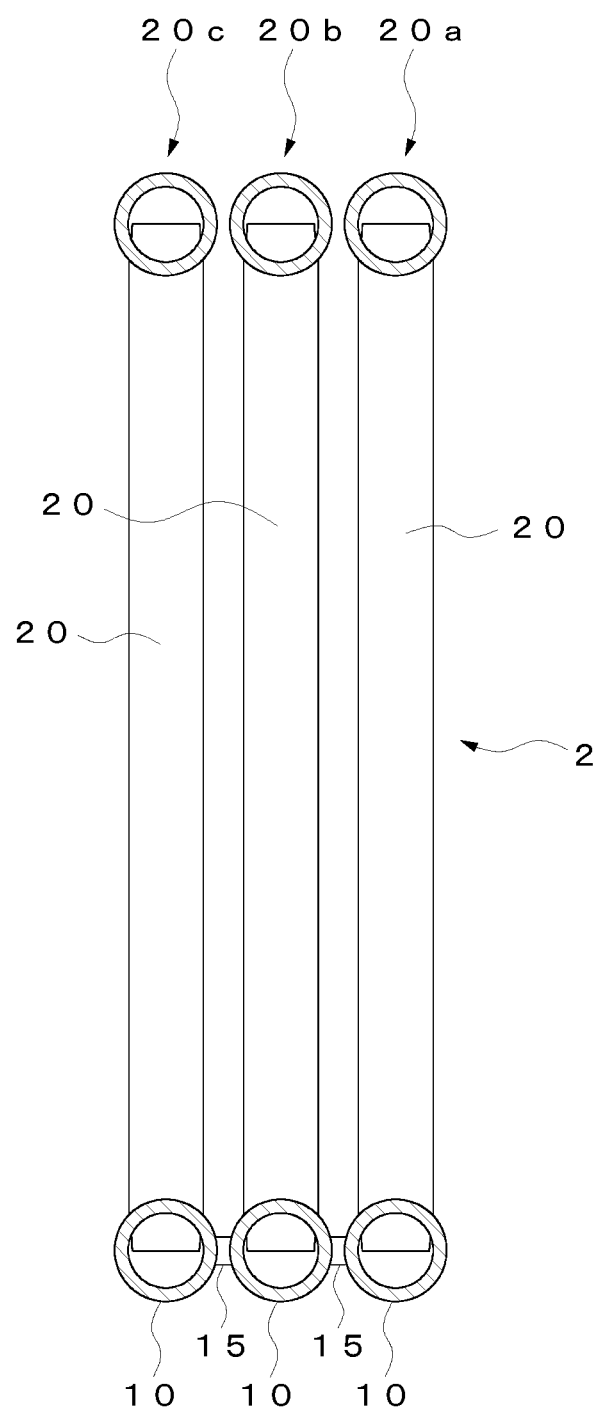
FIG. 9 is a cross-sectional side view of the heat exchanger.
Figure 10:
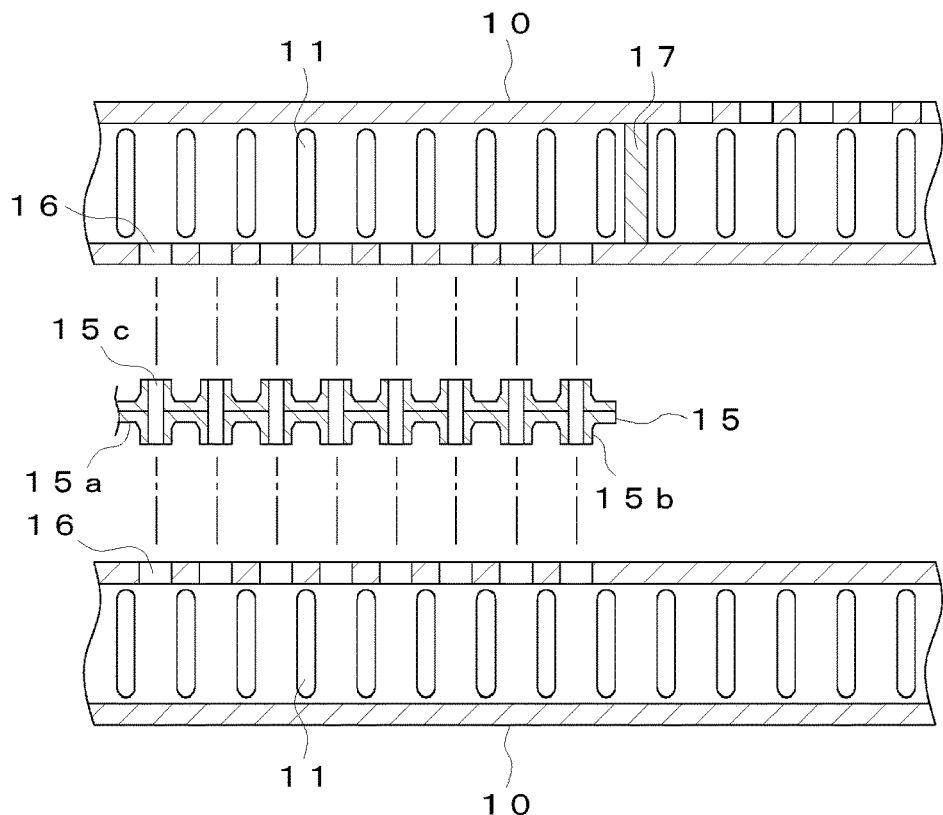
FIG. 10 is a main part exploded cross-sectional plan view of the heat exchanger.
Figure 11:
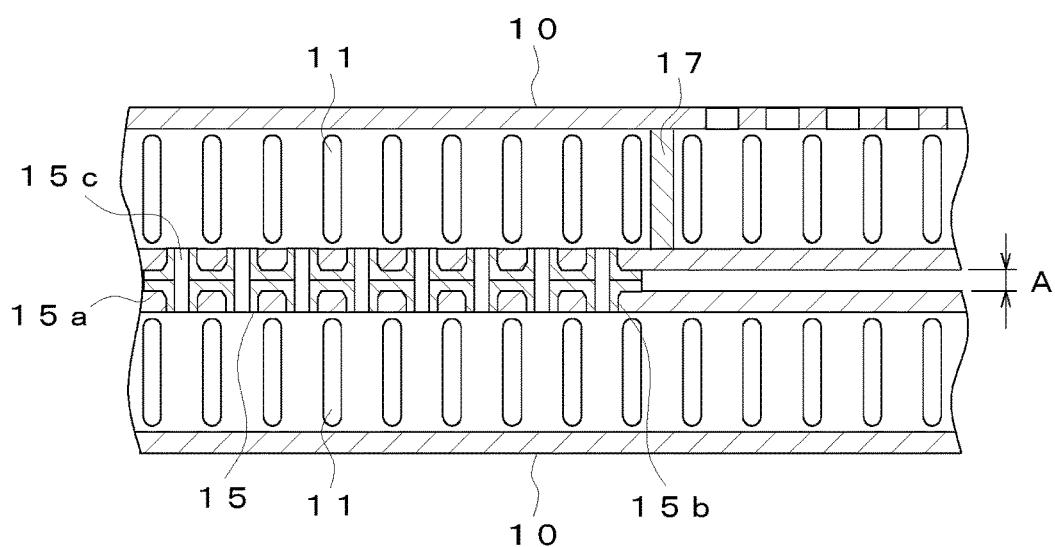
FIG. 11 is a main part cross-sectional plan view of the heat exchanger.
Figure 12:
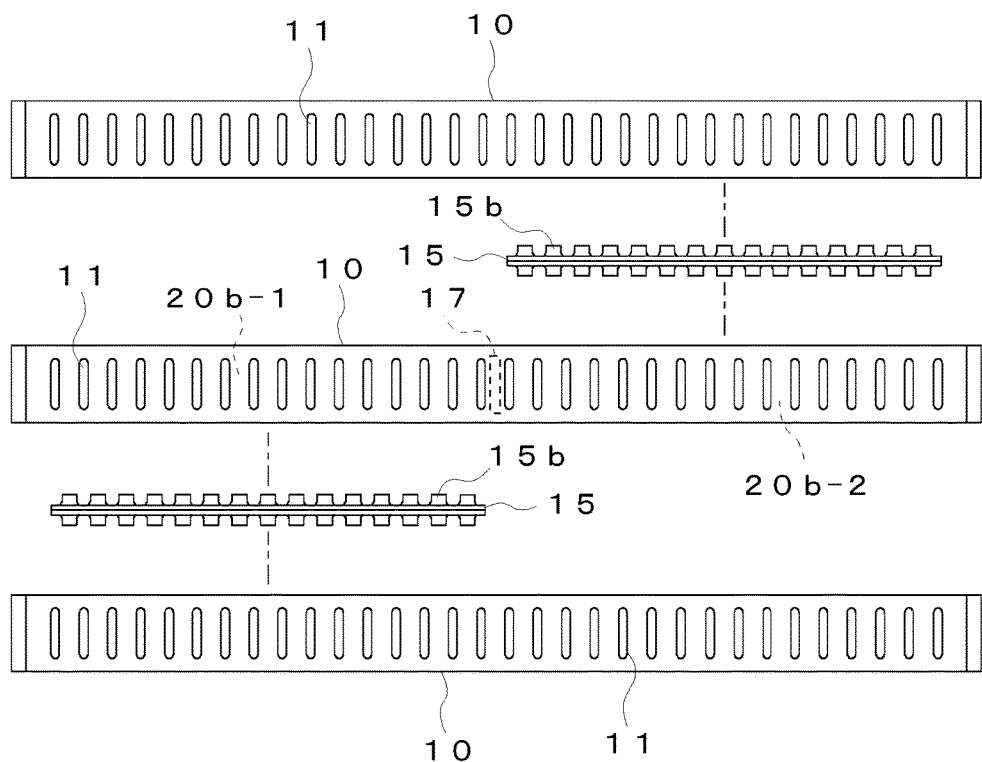
FIG. 12 is a main part exploded plan view of the heat exchanger.
Figure 13:
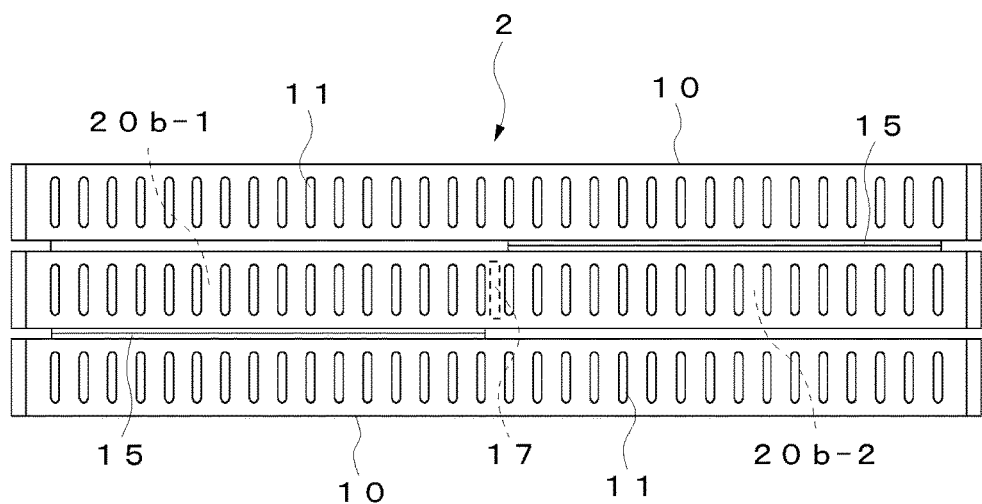
FIG. 13 is a main part plan view of the heat exchanger.

FIGS. 1 to 29 illustrate an embodiment of the present invention and illustrate, for example, a heat exchanger used as an evaporator of a vehicle air conditioning apparatus and configured to distribute a carbon dioxide refrigerant as a heating medium.

The heat exchanger is formed by arranging three tube groups, which include headers on both ends, in a front and back direction in a core section 2 of a heat exchanger body 1.

More specifically, the heat exchanger of the present embodiment includes: pairs of cylindrical headers 10 vertically arranged at intervals in a radial direction; and a plurality of flat tubes 20 arranged at intervals in an axial direction of the headers 10, both ends of the flat tubes 20 respectively connected to the headers 10.

Each of the headers 10 is a member made of metal, such as aluminum, formed into a cylindrical shape extending in a left and right direction. A plurality of connection holes 11 are provided on a side surface (peripheral wall surface) of the header 10 at equal intervals in the axial direction of the header 10, and end portions of the tubes 20 are connected to the connection holes 11. The connection holes 11 are formed in a long hole shape extending in a circumferential direction of the headers 10 and are formed to penetrate though peripheral wall portions of the headers 10. Three headers 10 are arranged close to each other on each side in the front and back direction (air flow direction) of the heat exchanger body 1, and both ends of the headers 10 in the axial direction are closed by lid members 12. The lid member 12 includes three lid portions 12a that close upper end or lower end opening portions of the three headers 10 arranged in the front and back direction of the heat exchanger body, and the lid portions 12a are formed integrally to each other.

Each of the tubes 20 is formed by an extrusion molded particle made of metal, such as aluminum, and is formed in a flat shape such that the dimension in the thickness direction is smaller than the dimension in the width direction. Both ends of the tubes 20 in the width direction are formed in a semicircular curved shape. A plurality of heating medium flow holes 21 forming flow channels in the tube 20 are provided in the tube 20 at equal intervals in the width direction of the tube 20. Each of the heating medium flow holes 21 is formed in an elliptical shape in cross section that is long in an up and down direction. The heating medium flow holes 21 are formed such that a minimum value of a width L at the center is less than 1.6 mm. In general, tubes with a width of 1.6 mm at the center of the heating medium flow hole are mainly used when a fluorocarbon refrigerant (R-134a) is used as the vehicle air conditioning apparatus. However, in the present embodiment using a carbon dioxide refrigerant, the minimum value of the width L at the center of the heating medium flow hole 21 is less than 1.6 mm in order to increase the wall thickness of the tubes 20 to secure the pressure resistance.

An insertion portion 22 inserted into the connection hole 11 of the header 10 is formed on an end portion side of the tube 20, and the width of the insertion portion 22 is narrower than the other part (center side of the tube 20 in the longitudinal direction). As a result, a step portion 23 engaged with an edge of the connection hole 11 during tube insertion is formed between the insertion portion 22 and the other part. The insertion portion 22 includes: a tapered portion 22a extending such that the width is gradually narrowed down from the step portion 23 toward the distal end of the tube 20; and a straight portion 22b extending such that the width is the same from the tapered portion 22a to the distal end of the tube 20. The proximal end side (step portion 23 side) of the tapered portion 22a is formed to have a width dimension equivalent to the connection hole 11.

To connect the end portion of the tube 20 to the header 10, the insertion portion 22 of the tube 20 is inserted into the connection hole 11 of the header 10, and the step portion 23 of the tube 20 is engaged with the edge of the connection hole 11 to thereby position the tube 20 in the insertion direction with respect to the header 10. In this case, since the straight portion 22b near the distal end of the insertion portion 22 has a width dimension smaller than the connection hole 11 due to the tapered portion 22a, the insertion portion 22 can be easily inserted into the connection hole 11.

Each heat transfer fin 30 is a member made of a metal plate, such as aluminum, formed into a waveform shape. The heat transfer fins 30 are arranged between the tubes 20 and are also arranged outside of the tubes 20 arranged on both sides of the heat exchanger in the width direction.

The heat exchanger forms the core section 2 by arranging, in the front and back direction, three tube groups (first tube group 20a, second tube group 20b, and third tube group 20c) from the front including a plurality of tubes 20 to which the headers 10 are connected at both ends. The heat transfer fins 30 are arranged between the tubes 20, and the heat transfer fins 30 arranged outside of the tubes 20 at both ends of the heat exchanger body 1 in the width direction are covered by end plates 31 extending along the tubes 20. Both ends of the end plates 31 in the longitudinal direction are bent toward the tubes 20, and the end plates 31 are formed to have a width that covers all of the heat transfer fins 30 of the tube groups 20a, 20b, and 20c. Furthermore, an inflow pipe 13 is connected to one end of the lower header 10 of the first tube group 20a, and an outflow pipe 14 is connected to one end of the lower header 10 of the third tube group 20c.

The lower headers 10 of the tube groups 20a, 20b, and 20c communicate with each other through communication members 15. In this case, halves in the axial direction (left side in the drawings) of the lower headers 10 of the first and second tube groups 20a and 20b communicate with each other, and halves in the axial direction (right side in the drawings) of the lower headers 10 of the second and third tube groups 20b and 20c communicate with each other.

The communication member 15 includes a plate-shaped portion 15a extending in the axial direction of the header 10 and a plurality of connection portions 15b connected to the header 10, and the connection portions 15b are provided at intervals in the axial direction of the header 10. The connection portions 15b are formed to protrude toward the outside in the thickness direction of the communication member 15, and communication holes 15c for communication between the headers 10 are provided on the connection portions 15b such that the communication holes 15c penetrate through the communication members 15 in the thickness direction. A plurality of connection holes 16 for connection with the communication member 15 are provided on each of the headers 10 arranged on the lower side, and the connection holes 16 are formed to open in the front and back direction of the heat exchanger body at communication positions of the headers 10.

Therefore, the communication members 15 are arranged between the lower headers 10 of the first and second tube groups 20a and 20b and between the lower headers 10 of the second and third tube groups 20b and 20c, and the connection portions 15a of the communication members 15 are inserted into the connection holes 16 of the headers 10 to thereby connect the lower headers 10 of the tube groups 20a, 20b, and 20c through the communication members 15. In this case, the plate-shaped portion 15a of the communication member 15 is interposed between the headers 10, and a gap A with a thickness equivalent to the plate-shaped portion 15a is formed.

A partition plate 17 that partitions the center of the inside of the header 10 in the axial direction is provided on the lower header 10 of the second tube group 20b, and the inside of the lower header 10 of the second tube group 20b is partitioned into a first space 20b-1 that communicates with the lower header 10 of the first tube group 20a and a second space 20b-2 that communicates with the lower header 10 of the third tube group 20c.

Figure 14:
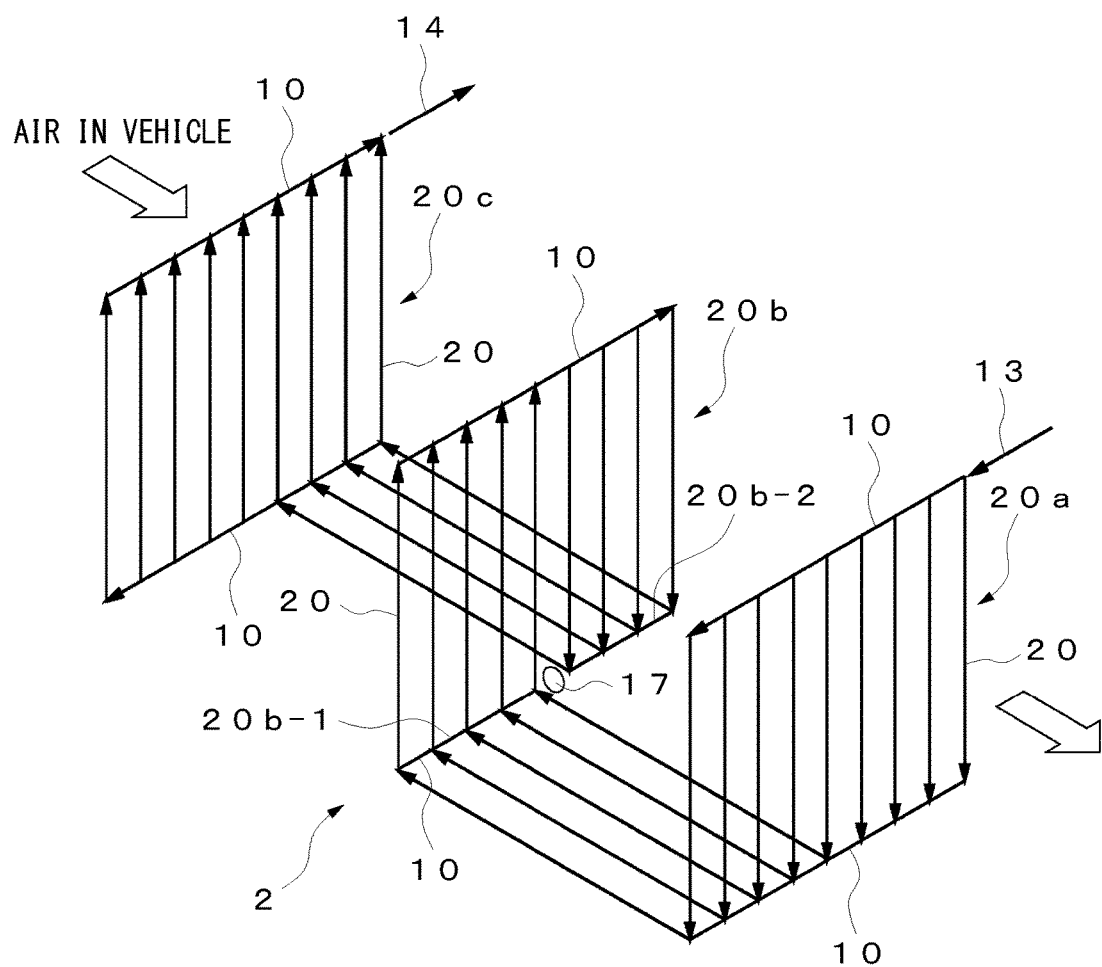
FIG. 14 is a schematic view showing refrigerant flow channels of a core section.
Figure 15:
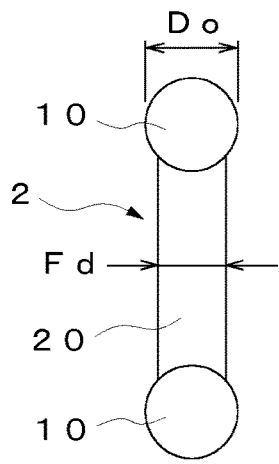
FIG. 15 is a side view and a front view showing the core section with one row of tube group.
Figure 15:
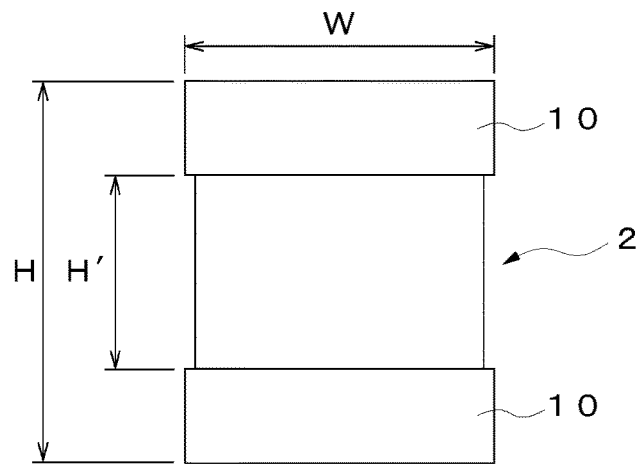
Figure 16:
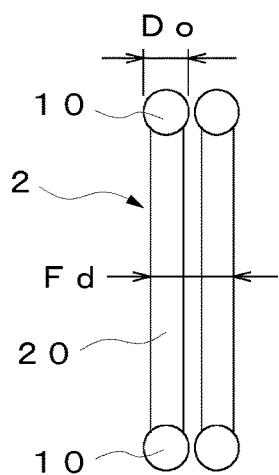
FIG. 16 is a side view and a front view showing the core section with two rows of tube groups.
Figure 16:
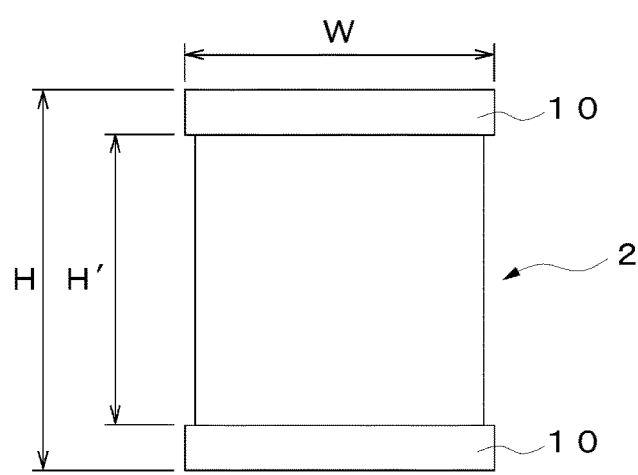
Figure 17:
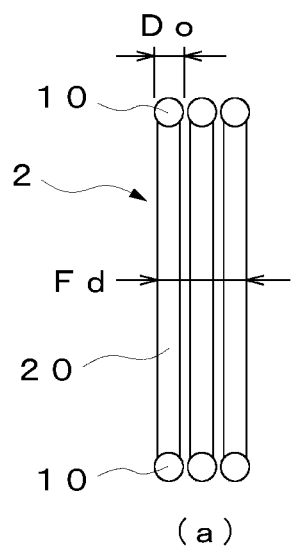
FIG. 17 is a side view and a front view showing the core section with three rows of tube groups.
Figure 17:
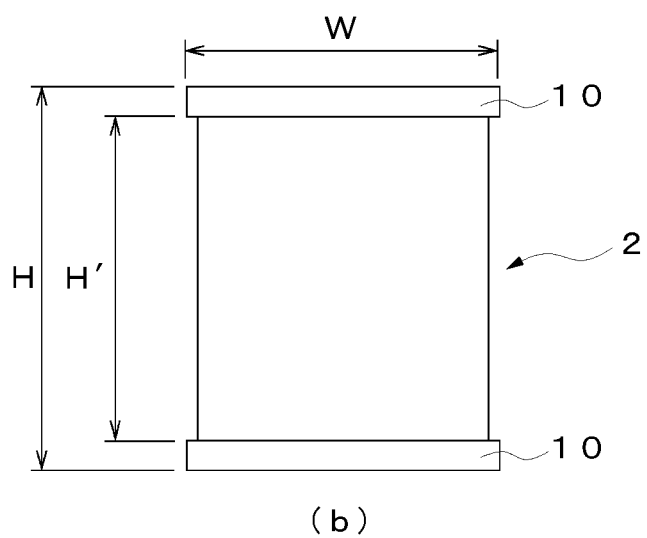
Figure 18:
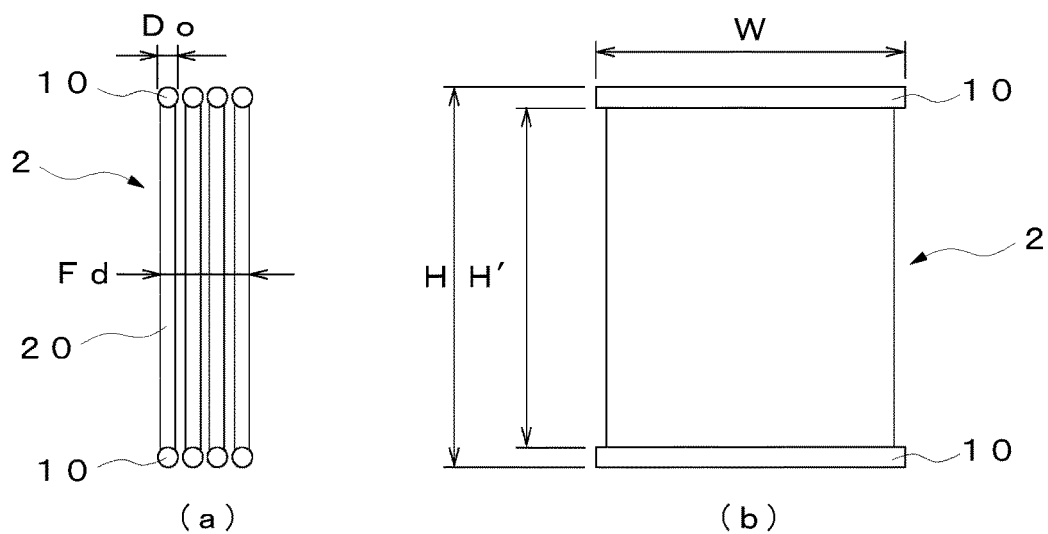
FIG. 18 is a side view and a front view showing the core section with four rows of tube groups.
Figure 19:
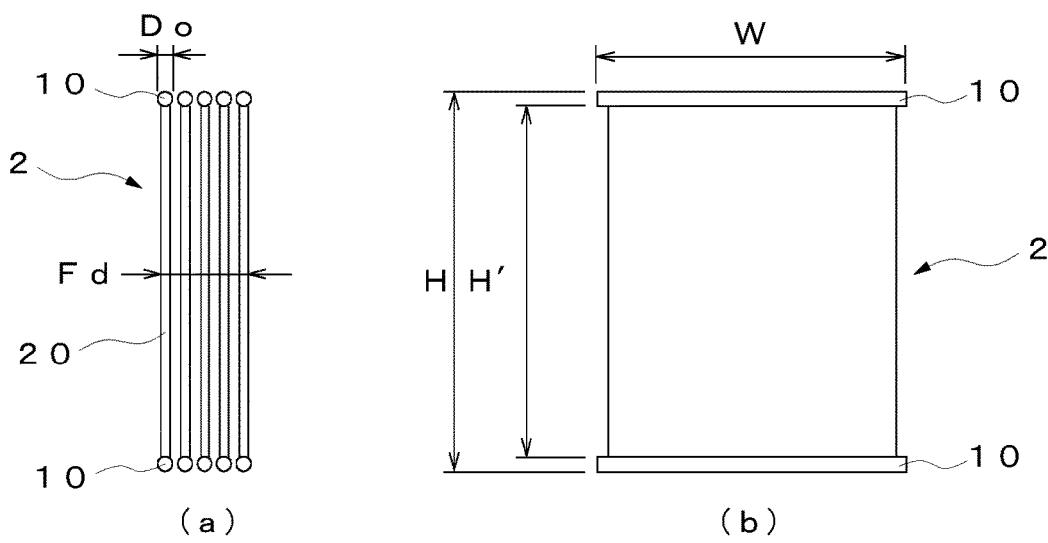
FIG. 19 is a side view and a front view showing the core section with five rows of tube groups.

In the heat exchanger configured as described above, a refrigerant of a refrigeration circuit (not shown) of the vehicle air conditioning apparatus enters from the inflow pipe 13. The refrigerant sequentially flows through the tube groups 20a, 20b, and 20c and then flows out from the outflow pipe 14. In this case, the refrigerant entered from the inflow pipe 13 flows from the upper header 10 of the first tube group 20a into the lower header 10 of the first tube group 20a through the first tube group 20a as shown in FIG. 14, and the refrigerant flows into the first space 20b-1 of the lower header 10 in the second tube group 20b through the communication holes 15c of one of the communication members 15. Next, the refrigerant of the first space 20b-1 flows through the left half of the second tube group 20b in FIG. 14 and then flows through the right half of the second tube group 20b in FIG. 14 through the upper header 10 of the second tube group 20b. The refrigerant flows into the second space 20b-2 of the lower header 10 in the second tube group 20b. Subsequently, the refrigerant of the second space 20b-2 flows into the lower header 10 in the third tube group 20c through the communication holes 15c of the other communication member 15 and then flows through the third tube group 20c. The refrigerant flows into the upper header of the third tube group 20c and flows out from the outflow pipe 14. In the core section 2 formed by the tube groups 20a, 20b, and 20c, the air in the vehicle flows from the back to the front of the heat exchanger body, and the heat is exchanged between the air in the vehicle and the refrigerant of the tube groups 20a, 20b, and 20c.

In the structure where the core section 2 includes the headers 10 on each of the plurality of tube groups 20a, 20b, and 20c as in the present embodiment, the wall thickness of the headers, the opening area of the core section, the weight of the core section 2, the pressure loss, the endothermic amount (heat exchange amount) per unit weight vary according to the number of tube groups. Therefore, an optimal number of tube groups is investigated by the following consideration, wherein a dimension H of the core section 2 in the height direction is set to 230 mm, a dimension W of the core section 2 in the left and right direction is set to 200 mm, a width dimension Fd of the core section 2 (dimension in the front and back direction) is set to 30 mm, 40 mm, and 50 mm, and the number of tube groups is set to 1 to 5 as shown in FIGS. 15 to 19. Note that the number of bend portions of the waveform of the heat transfer fins is increased or decreased according to the dimension of the core section 2 in the height direction. The width dimension of the tubes 20 is set to a dimension equal to the inner diameter of the headers 10, and the flow channel cross-sectional area of the tubes 20 is proportional to the width dimension of the tubes 20.

As for the wall thickness of the headers 10, a minimum wall thickness t [mm] of the headers 10 is obtained by the following expression (1), wherein Do [mm] represents the outer diameter of the headers 10 (pipes), P [MPa] represents the design pressure, $\sigma a$ [N/mm$^2$] represents the allowable tensile stress of the material, and $\eta$ represents the efficiency of the welded joint (refrigeration safety rules exemplified standard 23.6.1).

$$t=(P \cdot Do)/(2\ \sigma a \cdot \eta + 0.8P) \quad (1)$$

Figure 20:
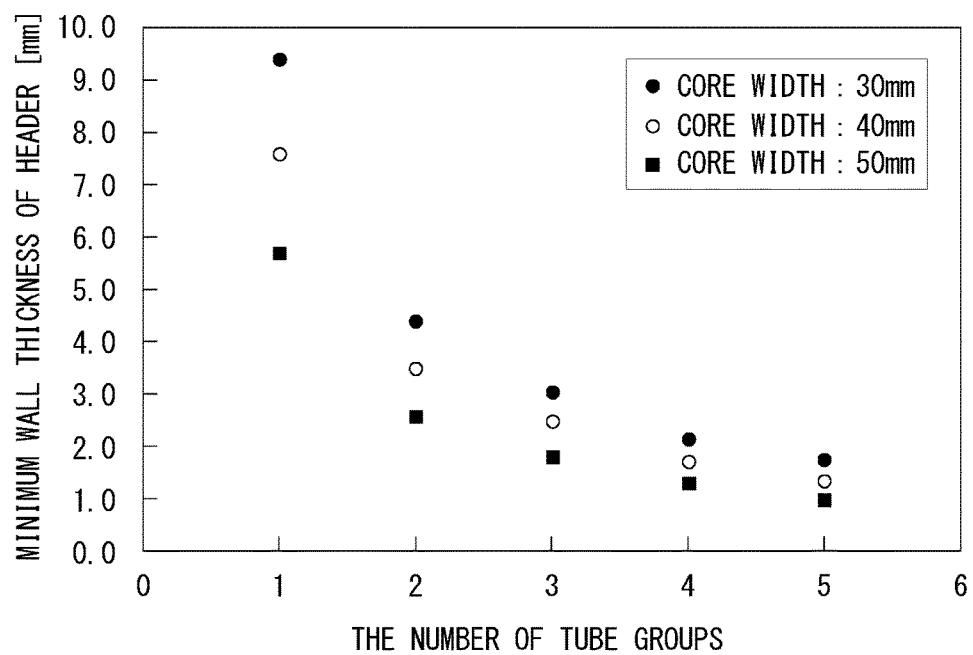
FIG. 20 is a graph showing a relationship between the minimum wall thickness of the headers and the number of tube groups.

Here, the relationship between the minimum wall thickness t of the headers 10 and the number of tube groups is as in the graph of FIG. 20, wherein P is 42 MPa, $\sigma a$ is 95 N/mm$^2$, $\eta$ is 1, Do is the outer diameter per header 1 determined from the width dimension Fd of the core section 2 and the number of tube groups (the number of headers in the front and back direction). According to the graph, it can be recognized that with any of the core widths Fd (30 mm, 40 mm, and 50 mm), the minimum wall thickness of the headers 10 increases with a decrease in the number of tube groups, and the minimum wall thickness of the headers 10 decreases with an increase in the number of tube groups.

Next, as for the opening area of the core section 2, when the height of the opening portion of the core section 2 is defined as H', H' (=H−2 Do) is a height obtained by subtracting the outer diameter Do of two upper and lower headers 10 from the height dimension H of the core section 2. Therefore, an opening area M of the core section 2 is obtained by the following expression (2).

$$M = H' \times W \quad (2)$$

Figure 21:
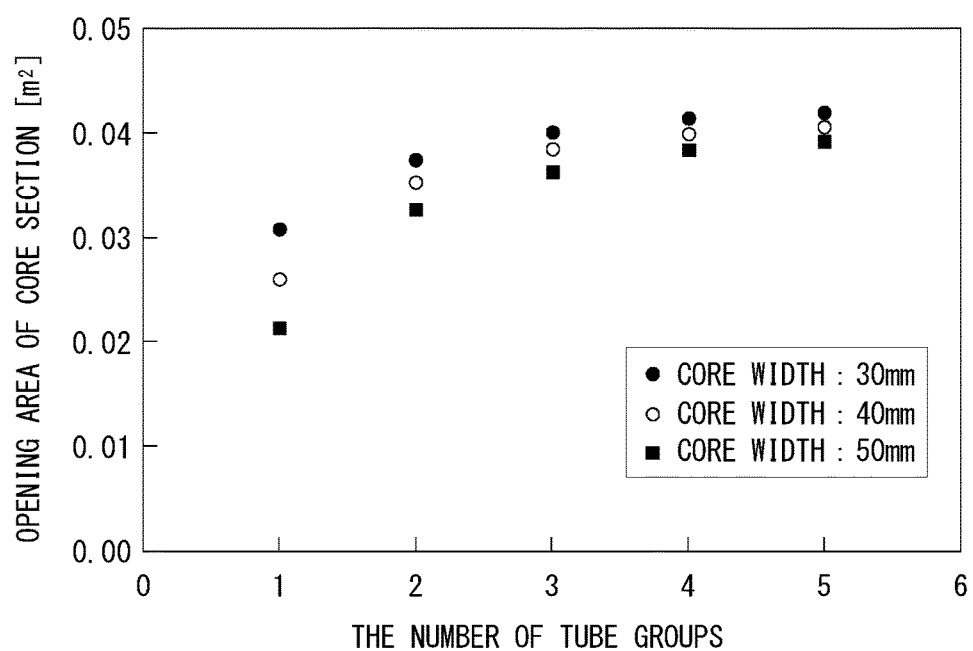
FIG. 21 is a graph showing a relationship between the opening area of the core section and the number of tube groups.

According to expression (2), the relationship between the opening area M of the core section 2 and the number of tube groups is as in the graph of FIG. 21. According to the graph, it can be recognized that in any of the core widths Fd, the opening area M of the core section 2 decrease with a decrease in the number of tube groups, and the opening area M of the core section 2 increases with an increase in the number of tube groups.

Figure 22:
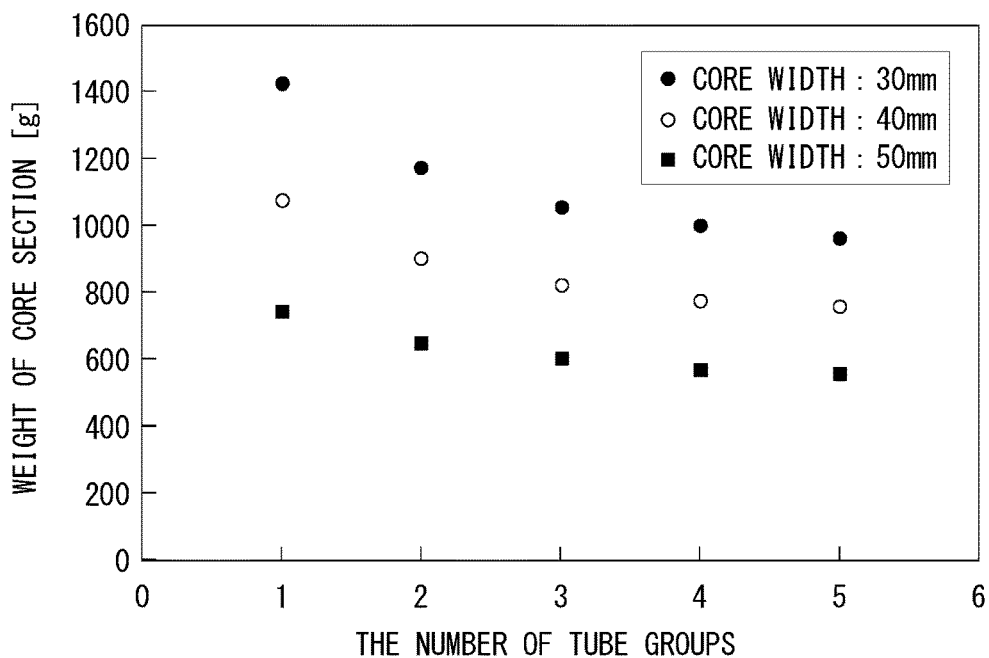
FIG. 22 is a graph showing a relationship between the weight of the core section and the number of tube groups.

As for the weight of the core section 2, the relationship between the weight of the core section 2 and the number of tube groups is as in the graph of FIG. 22 based on the relationship between the minimum wall thickness t of the headers 10 and the number of tube groups shown in FIG. 20. According to the graph, it can be recognized that with any of the core widths Fd (30 mm, 40 mm, and 50 mm), the weight of the core section 2 increases with a decrease in the number of tube groups, and the weight of the core section 2 decreases with an increase in the number of tube groups.

As for the pressure loss and the endothermic amount per unit weight, the conditions of the refrigerant are set, such that the inlet enthalpy of the heat exchanger (evaporator) is 272 kJ/kg, the outlet pressure is 3.4 MPaG, the outlet superheat is equal to or smaller than 2K, the inlet pressure and the refrigerant circulation rate are left to chance, and the refrigerant is a carbon dioxide refrigerant. The conditions of the air flowing through the core section 2 are set, such that the temperature is 40° C., the humidity is 40%, and the air flow is 420 m$^3$/h. The pressure loss and the endothermic amount per unit weight are obtained by an experiment and a simulation.

Figure 23:
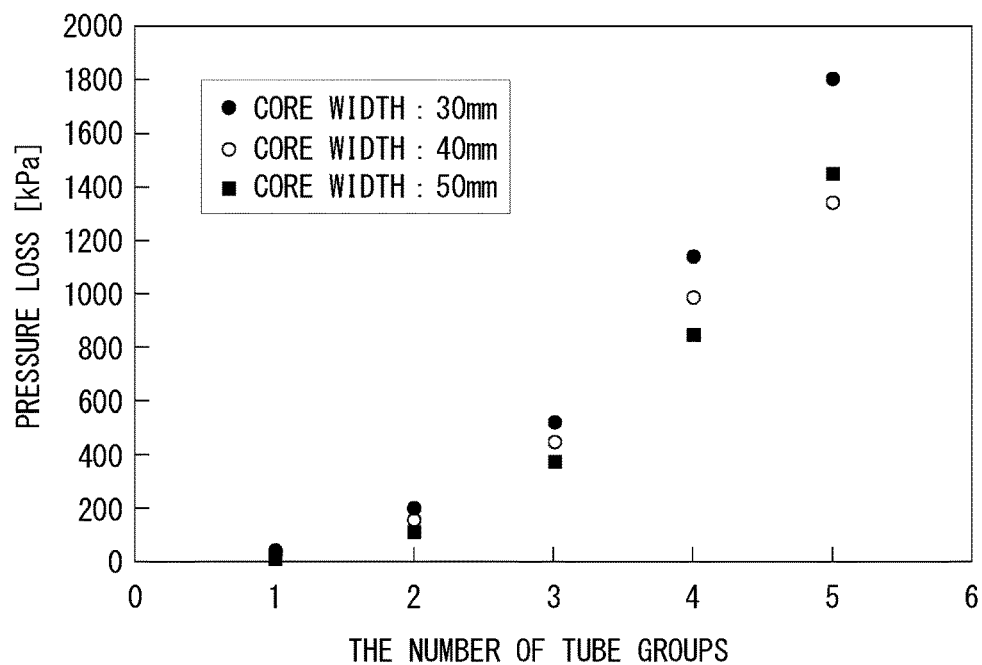
FIG. 23 is a graph showing a relationship between the pressure loss and the number of tube groups.

As a result of the experiment and the simulation, the relationship between the pressure loss and the number of tube groups is as in the graph of FIG. 23. According to the graph, it can be recognized that with any of the core widths Fd (30 mm, 40 mm, and 50 mm), the pressure loss decreases with a decrease in the number of tube groups, and the pressure loss increases with an increase in the number of tube groups.

Figures 24, 25:
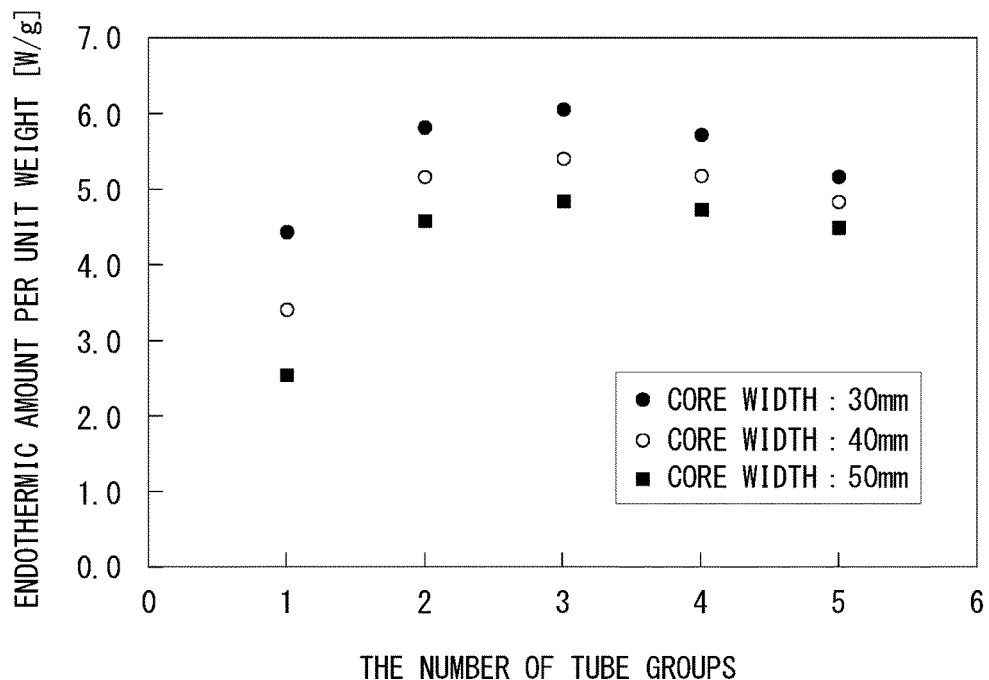
FIG. 24 is a graph showing a relationship between the endothermic amount per unit weight and the number of tube groups.
FIG. 25 is a diagram showing a relationship between the refrigerant flow path and the flow channel cross-sectional area of each tube width.

The relationship between the endothermic amount per unit weight and the number of tube groups is as in the graph of FIG. 24. According to the graph, it can be recognized that with any of the core widths Fd (30 mm, 40 mm, and 50 mm), the endothermic amount per unit weight is the highest when the number of tube groups is three. The endothermic amount per unit weight decreases with a decrease in the number of tube groups from three, and the endothermic amount per unit weight decreases with an increase in the number of tube groups from three.

Therefore, the opening area of the core section 2 increases with an increase in the number of tube groups of the core section 2. It is advantageous that the heat exchange area can be increased, and the weight of the core section 2 can be reduced to allow weight saving. However, when the number of tube groups is large, the width dimension of each tube 20 becomes small, and the flow channel cross-sectional area per tube is reduced. The flow channel of the refrigerant becomes long, and the pressure loss becomes large. It is disadvantageous that the heat exchange amount is reduced. On the other hand, when the number of tube groups is reduced, the width dimension of each tube becomes large, and the flow channel cross-sectional area per tube also increases. The flow channel of the refrigerant also becomes short, and it is advantageous that the pressure loss also becomes small. However, the dimension of the outer diameter of the headers 10 becomes large. Therefore, it is disadvantageous that the opening area of the core section 2 becomes small, and the heat exchange area is reduced. It is also disadvantageous that the weight of the core section 2 becomes large, and the weight cannot be saved. Therefore, it is difficult to determine the optimal number of tube groups by evaluating only the wall thickness of the headers 10, the opening area of the core section 2, the weight of the core section, and the pressure loss.

On the other hand, an evaluation result is obtained which indicates that the endothermic amount per unit weight is the largest when the number of tube groups is three. Therefore, the number of tube groups of the core section 2 can be set to three to configure the heat exchanger with a lower weight and a higher endothermic capacity than the other numbers of tube groups.

On the other hand, even when the width dimensions of the tubes 20 are equal, the flow channel cross-sectional area per tube varies according to the number of heating medium flow holes 21 forming the flow channels of the tubes 20. Therefore, the relationship between the width of the tubes and the flow channel cross-sectional area is set to make it advantageous in terms of performance and pressure resistance.

More specifically, the width dimension of the tubes will be defined as Tw [mm], the flow channel cross-sectional area per tube will be defined as S [mm²], and the number of heating medium flow holes 21 per tube will be defined as N. Minimum values and maximum values of the flow channel cross-sectional area S with respect to the width dimension Tw are obtained by experiments and simulations, wherein the width dimension Tw of the tubes is equal to or greater than 5 mm and equal to or smaller than 11 mm, and the number of heating medium flow holes 21 is N. In this case, the minimum value of the flow channel cross-sectional area S is a minimum flow channel cross-sectional area that can secure a sufficient refrigerant flow rate, and the maximum value of the flow channel cross-sectional area S is a maximum flow channel cross-sectional area that can secure a sufficient pressure resistance. The minimum value of the number N of heating medium flow holes 21 of each tube width is a minimum number of heating medium flow holes 21 that can secure a sufficient refrigerant flow rate with the tube width, and the maximum value of the number N of heating medium flow holes 21 of each tube width is a maximum number of heating medium flow holes 21 that can secure a sufficient pressure resistance with the tube width. As shown in FIG. 25, the results of the simulations are as follows.

When the width dimension Tw of the tubes 20 is 5 mm, the minimum value of the number N of heating medium flow holes 21 is 3, the maximum value of N is 4, the minimum value of the flow channel cross-sectional area S is 0.889 mm², and the maximum value of S is 1.797 mm².

When the width dimension Tw of the tubes 20 is 6 mm, the minimum value of the number N of heating medium flow holes 21 is 4, the maximum value of N is 5, the minimum value of the flow channel cross-sectional area S is 1.185 mm², and the maximum value of S is 2.246 mm².

When the width dimension Tw of the tubes 20 is 7 mm, the minimum value of the number N of heating medium flow holes 21 is 5, the maximum value of N is 5, the minimum value of the flow channel cross-sectional area S is 1.482 mm², and the maximum value of S is 2.246 mm².

When the width dimension Tw of the tubes 20 is 8 mm, the minimum value of the number N of heating medium flow holes 21 is 5, the maximum value of N is 6, the minimum value of the flow channel cross-sectional area S is 1.482 mm², and the maximum value of S is 2.695 mm².

When the width dimension Tw of the tubes 20 is 9 mm, the minimum value of the number N of heating medium flow holes 21 is 6, the maximum value of N is 7, the minimum value of the flow channel cross-sectional area S is 1.778 mm², and the maximum value of S is 3.145 mm².

When the width dimension Tw of the tubes 20 is 10 mm, the minimum value of the number N of heating medium flow holes 21 is 7, the maximum value of N is 8, the minimum value of the flow channel cross-sectional area S is 2.074 mm², and the maximum value of S is 3.594 mm².

When the width dimension Tw of the tubes 20 is 11 mm, the minimum value of the number N of heating medium flow holes 21 is 8, the maximum value of N is 9, the minimum value of the flow channel cross-sectional area S is 2.371 mm², and the maximum value of S is 4.043 mm².

Figure 26:
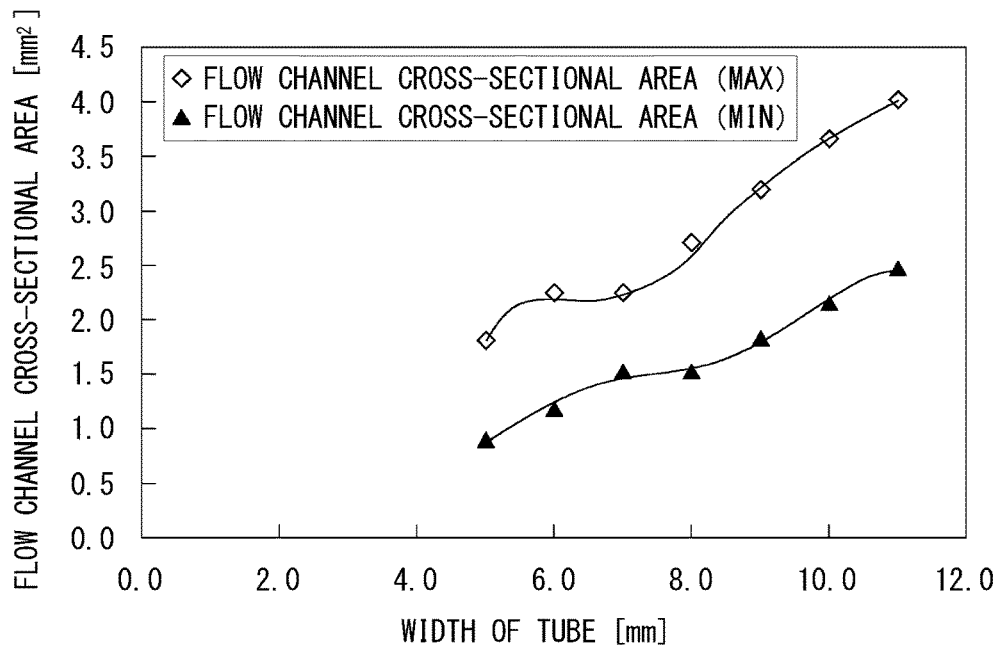
FIG. 26 is a graph showing a relationship between the flow channel cross-sectional area and the tube width.
Figure 27:
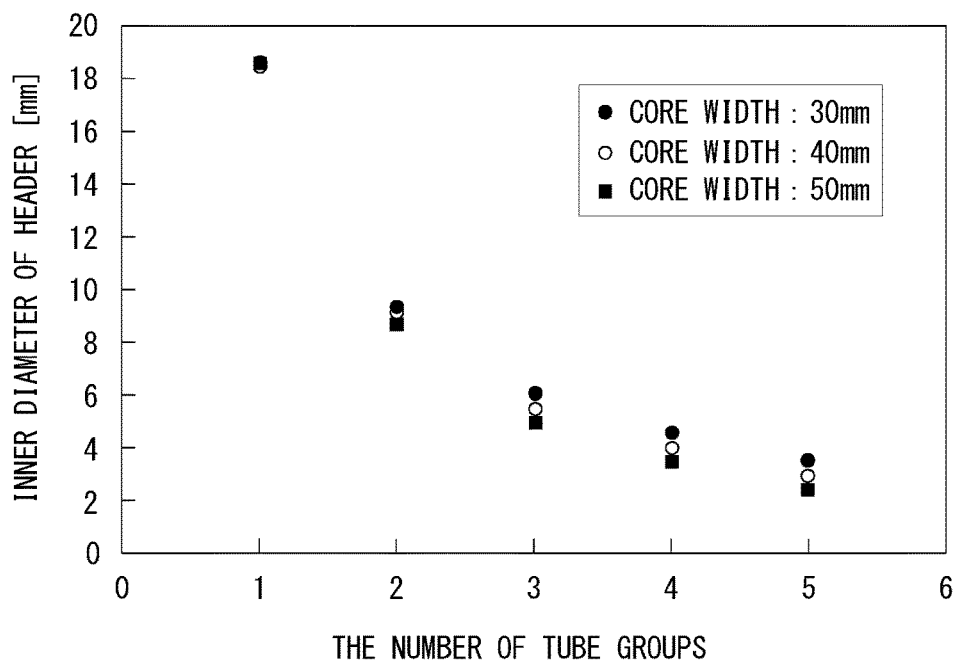
FIG. 27 is a graph showing a relationship between the inner diameter of the headers and the number of tube groups.

As a result, when the width dimension Tw of the tubes 20 is equal to or greater than 5 mm and equal to or smaller than 11 mm, an approximate curve of a minimum value S1 of the flow channel cross-sectional area S is expressed by the following expression (3), and an approximate curve of a maximum value S2 of the flow channel cross-sectional area S is expressed by the following expression (4). Note that the relationship between the flow channel cross-sectional area S and the width Tw of the tubes is as in the graph of FIG. 26, and FIG. 26 shows the approximate curve of the minimum value S1 and the approximate curve of the maximum value S2 of the flow channel cross-sectional area S.

$$S1 = -0.002470 \times Tw^5 + 0.09542 \times Tw^4 - 1.436 \times Tw^3 + 10.50 \times Tw^2 - 37.08 \times Tw + 51.31 \quad (3)$$

$$S2 = 0.005616 \times Tw^5 - 0.2314 \times Tw^4 + 3.746 \times Tw^3 - 29.70 \times Tw^2 - 115.4 \times Tw - 173.9 \quad (4)$$

Therefore, the number N of heating medium flow holes 21 per tube is $3 \leq N \leq 5$ when 5 mm$\leq Tw \leq$6 mm, $4 \leq N \leq 5$ when 6 mm$<Tw \leq$7 mm, $5 \leq N \leq 6$ when 7 mm$\leq Tw \leq$8 mm, $5 \leq N \leq 7$ when 8 mm$<Tw \leq$9 mm, $6 \leq N \leq 8$ when 9 mm$<Tw \leq$10 mm, and $7 \leq N \leq 9$ when 10 mm$<Tw \leq$11 mm. The number N of heating medium flow holes 21 per tube and the flow channel cross-sectional area S can be set such that the width dimension Tw of the tubes 20 and the flow channel cross-sectional area S satisfy a relationship of $S1 \leq S \leq S2$, and sufficient refrigerant flow rate and pressure resistance can be secured.

In this way, according to the present embodiment, the number of arrays of the tube groups of the core section 2 is three rows, and the number N of heating medium flow holes 21 per tube is set for each width dimension Tw of the tubes 20. The tubes 20 are formed such that the width dimension Tw of the tubes and the flow channel cross-sectional area S satisfy the relationship of $S1 \leq S \leq S2$. Therefore, the number of arrays of the tube groups in the core section 2 can be the optimal number of arrays for improving the endothermic capacity and reducing the weight, and sufficient refrigerant flow rate and pressure resistance can be secured. As a result, even when there is a restriction on the size of the entire heat exchanger, a light high-performance heat exchanger can be configured. This is significantly advantageous when the heat exchanger is used as an evaporator of a vehicle air conditioning apparatus for which a reduction in the weight of the components and an increase in the performance are demanded.

As for an inner diameter D of the headers 10, if the outer diameter Do of the headers 10, the design pressure P, the allowable tensile stress σa of the material, and the efficiency r of the welded joint are determined as described above, the inner diameter D [mm] of the headers 10 is set by using expression (1) to obtain the minimum wall thickness t [mm] of the headers. Here, the relationship between the inner diameter D of the headers 10 and the number of tube groups is as in the graph of FIG. 27, wherein P is 42 MPa, σa is 95

N/mm², η is 1, Do is the outer diameter per header determined by the width dimension Fd of the core section 2 and the number of tube groups (the number of headers in the front and back direction), and the gap A between the headers arranged in the front and back direction is 1 mm, 2 mm, and 3 mm as described above.

Here, the minimum value and the maximum value of the inner diameter D of the headers 10 are obtained by experiments and simulations, wherein the number of arrays of the headers 10 in the core section 2 and the tube groups is three rows, the inner diameter D of the headers 10 and the width dimension Tw of the tubes 20 are equal, and the gap A between the headers 10 is 1 mm to 3 mm. In this case, the minimum value of the inner diameter D of the headers 10 is a minimum inner diameter that can secure a sufficient refrigerant flow rate, and the maximum value of the inner diameter D of the headers 10 is a maximum inner diameter that can secure a sufficient pressure resistance. As a result of the simulations, the relationship between the inner diameter D of the headers 10 and the width dimension Fd of the core section 2 is as in the graph of FIG. 28.

More specifically, a minimum value D1 [mm] of the inner diameter D of the headers 10 is expressed by the following expression (5), and a maximum value D2 [mm] of the inner diameter D of the headers 10 is expressed by the following expression (6), wherein the width dimension Fd of the core section 2 is equal to or greater than 30 mm and equal to or smaller than 50 mm.

$$D1 = 0.2081 \times Fd - 1.2487 \qquad (5)$$

$$D2 = 0.2081 \times Fd - 0.4162 \qquad (6)$$

Therefore, sufficient refrigerant flow rate and pressure resistance can be secured by forming the headers 10 such that the width dimension Fd of the core section 2 and the inner diameter D of the headers satisfy a relationship of $D1 \leq D \leq D2$.

Based on the configuration, whether the surface tension of water generates a liquid bridge between the headers 10 is further tested, wherein the gap A between the headers 10 adjacent to each other in the front and back direction among the headers is 0.5 mm to 2 mm.

In the test, the generation state of the liquid bridge is visually checked, wherein two pipes made of the same material as the headers 10 are arranged in parallel, and the gap A in the radial direction is set to 0.5 mm, 1.0 mm, 1.5 mm, and 2.0 mm.

Figures 28, 29:
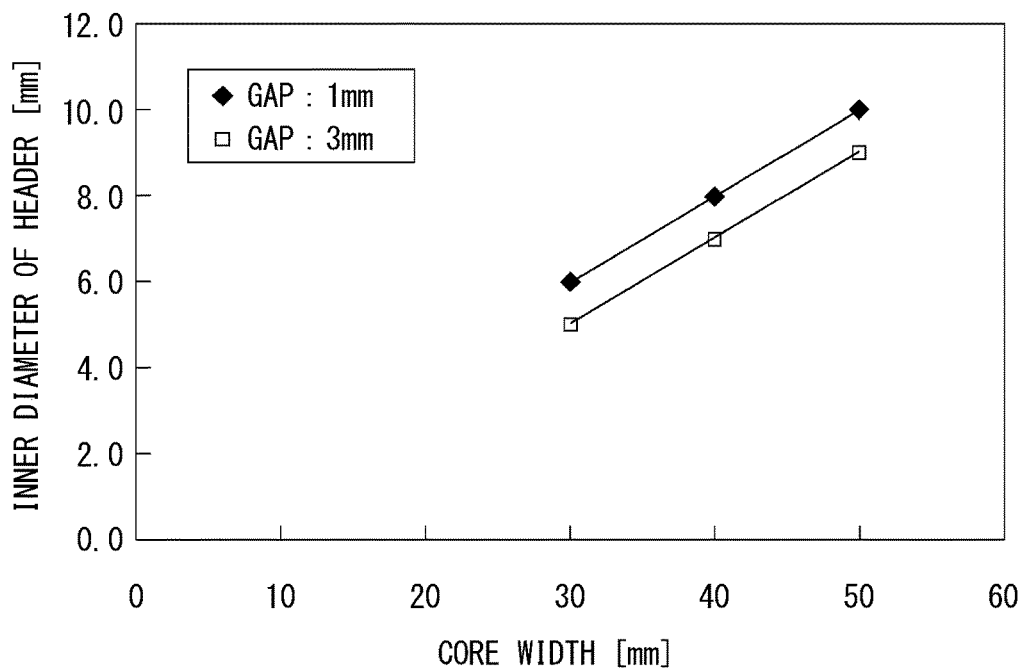
FIG. 28 is a graph showing a relationship between the inner diameter of the headers and the core width.
FIG. 29 is a diagram showing test results regarding the gap between the headers.

As a result of the test, the liquid bridge is formed in a wide range between the pipes when the gap A is 0.5 mm, and the liquid bridge is formed in a narrow range between the pipes when the gap A is 1.0 mm as shown in FIG. 29. The liquid bridge is formed only in a very narrow range between the pipes when the gap A is 1.5 mm, and the liquid bridge is not formed between the pipes when the gap A is 2.0 mm. Based on this, it is determined that the drainage between the pipes is substantially favorable when the gap A is equal to or greater than 1.0 mm.

Therefore, the gap A between the headers 10 can be set to equal to or greater than 1 mm to sufficiently secure the drainage between the headers 10, and the condensed water flown down to the lower headers from the tubes 20 and the heat transfer fins 30 is not easily accumulated between the headers 10. This is effective in preventing damage of peripheral members due to freezing of the condensed water accumulated between the headers 10. In this case, although sufficient drainage can be secured when the gap A is 2.0 mm, the drainage may be reduced depending on the surface quality (such as scratches and stains) of the header 10. In consideration of this, the gap A is set to equal to or smaller than 3.0 mm. This is advantageous in that the condensed water can be surely drained from between the headers 10, and the size of the core section 2 is not unnecessarily increased in the front and back direction due to an excessively large gap A.

Furthermore, the present embodiment provides the plate-shaped communication members 15 arranged between the lower headers 10 adjacent to each other in the front and back direction among the headers 10 and configured to allow communication between the headers 10. The gap A is formed between the headers 10 according to the thickness of the plate-shaped portions 15a of the communication members 15. Therefore, the gap A between the headers 10 can be set by setting the thickness of the plate-shaped portions 15a of the communication members 15, and the gap A between the headers 10 can be easily and accurately formed.

In the present embodiment, the core section 2 includes the first, second, and third tube groups 20a, 20b, and 20c sequentially arranged from the front. The refrigerant entered from the inflow pipe 13 on one end side in the axial direction of the header 10 on one side in the up and down direction of the first tube group 20a flows through the first tube group 20a and flows into the header 10 on the other side in the up and down direction of the first tube group 20a. The refrigerant flown from the header 10 on the other side in the up and down direction of the first tube group 20a into the first space 20b-1 of the header 10 on the one side in the up and down direction of the second tube group 20b flows through a part of the second tube group 20b and flows into the header 10 on the other side in the up and down direction of the second tube group 20b. The refrigerant flown into the header 10 on the other side in the up and down direction of the second tube group 20b flows through another part of the second tube group 20b and flows into the second space 20b-2 of the header 10 on the one side in the up and down direction of the second tube group. The refrigerant flown into the second space 20b-2 of the header 10 on the one side in the up and down direction of the second tube group 20b flows into the header 10 on the one side in the up and down direction of the third tube group 20c. The refrigerant flown into the header 10 on the one side in the up and down direction of the third tube group 20c flows through the third tube group 20c and flows into the header 10 on the other side in the up and down direction of the third tube group 20c. The refrigerant flows out from the outflow pipe 14 on one end side in the axial direction of the header 10 on the other side in the up and down direction of the third tube group 20c. Therefore, the inflow pipe 13 and the outflow pipe 14 can be arranged on one end side of the upper header 10, and piping for the inflow pipe 13 and the outflow pipe 14 can be easily performed.

REFERENCE SIGNS LIST

1 . . . heat exchanger body, 2 . . . core section, 10 . . . header, 15 . . . communication member, 20 . . . tube, 20a . . . first tube group, 20b . . . second tube group, 20b-1 . . . first space, 20b-2 . . . second space, 20c . . . third tube group, 21 . . . heating medium flow hole

The invention claimed is:

1. A heat exchanger comprising:
a pair of cylindrical headers vertically arranged at an interval in a radial direction; and a plurality of flat tubes arranged at intervals in an axial direction of the headers, both ends of each of the tubes being connected to the respective headers, the heat exchanger further comprising a plurality of tube groups arranged in an air flow direction, the tube groups comprising the plurality of tubes including the headers at both ends, the heat exchanger exchanging heat of air flowing through a core section formed by the tube groups and heat of a heating medium flowing through a plurality of heating medium flow holes forming flow channels in each of the tubes, wherein three headers and three tube groups are arranged in the air flow direction to form the core section, when a width dimension of the tubes is defined as Tw, a flow channel cross-sectional area per tube is defined as S, and the number of heating medium flow holes per tube is defined as N, the width dimension Tw of the tubes is equal to or greater than 5 mm and equal to or smaller than 11 mm, N is $3 \leq N \leq 5$ when $5\ mm \leq Tw \leq 6\ mm$, $4 \leq N \leq 5$ when $6\ mm < Tw \leq 7\ mm$, $5 \leq N \leq 6$ when $7\ mm < Tw \leq 8\ mm$, $5 \leq N \leq 7$ when $8\ mm < Tw \leq 9\ mm$, $6 \leq N \leq 8$ when $9\ mm < Tw \leq 10\ mm$, and $7 \leq N \leq 9$ when $10\ mm < Tw \leq 11\ mm$, and the width dimension Tw of the tubes and the flow channel cross-sectional area S satisfy a relationship of $-0.002470 \times Tw^5 + 0.09542 \times Tw^4 - 1.436 \times Tw^3 + 10.50 \times Tw^2 - 37.08 \times Tw + 51.31 \leq S \leq 0.005616 \times Tw^5 - 0.2314 \times Tw^4 + 3.746 \times Tw^3 - 29.70 \times Tw^2 + 115.4 \times Tw - 173.9$.

2. The heat exchanger according to claim 1, wherein
when a dimension of the core section in the air flow direction is defined as Fd, and an inner diameter of the headers is defined as D, the dimension Fd of the core section in the air flow direction is equal to or greater than 30 mm and equal to or smaller than 50 mm, and the dimension Fd of the core section in the air flow direction and the inner diameter D of the headers satisfy a relationship of $0.2081 \times Fd - 1.2487 \leq D \leq 0.2081 \times Fd - 0.4162$.

3. The heat exchanger according to claim 1, wherein
a gap between the headers adjacent to each other in the air flow direction among the headers is equal to or greater than 1 mm and equal to or smaller than 3 mm.

4. The heat exchanger according to claim 1, further comprising
plate-shaped communication members arranged between the headers adjacent to each other in the air flow direction among the headers and configured to allow communication between the headers, wherein
a gap is formed between the headers according to a thickness of the communication members.

5. The heat exchanger according to claim 1, wherein
the core section comprises first, second, and third tube groups sequentially arranged from the front, the heating medium entered from one end side in the axial direction of the header on one side in an up and down direction of the first tube group flows through the first tube group and flows into the header on another side in the up and down direction of the first tube group, the heating medium flown from the header on the other side in the up and down direction of the first tube group into a part of the header on the one side in the up and down direction of the second tube group flows through a part of the second tube group and flows into the header on the other side in the up and down direction of the second tube group, the heating medium flown into the header on the other side in the up and down direction of the second tube group flows through another part of the second tube group and flows into another part of the header on the one side in the up and down direction of the second tube group, the heating medium flown into the other part of the header on the one side in the up and down direction of the second tube group flows into the header on the one side in the up and down direction of the third tube group, the heating medium entered into the header on the one side in the up and down direction of the third tube group flows through the third tube group and flows into the header on the other side in the up and down direction of the third tube group, and the heating medium flows out from one end side in the axial direction of the header on the other side in the up and down direction of the third tube group.

6. The heat exchanger according to claim 3, further comprising
plate-shaped communication members arranged between the headers adjacent to each other in the air flow direction among the headers and configured to allow communication between the headers, wherein
a gap is formed between the headers according to a thickness of the communication members.

7. The heat exchanger according to claim 3, wherein
the core section comprises first, second, and third tube groups sequentially arranged from the front, the heating medium entered from one end side in the axial direction of the header on one side in an up and down direction of the first tube group flows through the first tube group and flows into the header on another side in the up and down direction of the first tube group, the heating medium flown from the header on the other side in the up and down direction of the first tube group into a part of the header on the one side in the up and down direction of the second tube group flows through a part of the second tube group and flows into the header on the other side in the up and down direction of the second tube group, the heating medium flown into the header on the other side in the up and down direction of the second tube group flows through another part of the second tube group and flows into another part of the header on the one side in the up and down direction of the second tube group, the heating medium flown into the other part of the header on the one side in the up and down direction of the second tube group flows into the header on the one side in the up and down direction of the third tube group, the heating medium entered into the header on the one side in the up and down direction of the third tube group flows through the third tube group and flows into the header on the other side in the up and down direction of the third tube group, and the heating medium flows out from one end side in the axial direction of the header on the other side in the up and down direction of the third tube group.

8. The heat exchanger according to claim 2, wherein
a gap between the headers adjacent to each other in the air flow direction among the headers is equal to or greater than 1 mm and equal to or smaller than 3 mm.

9. The heat exchanger according to claim 2, further comprising
plate-shaped communication members arranged between the headers adjacent to each other in the air flow direction among the headers and configured to allow communication between the headers, wherein
a gap is formed between the headers according to a thickness of the communication members.

10. The heat exchanger according to claim 2, wherein the core section comprises first, second, and third tube groups sequentially arranged from the front, the heating medium entered from one end side in the axial direction of the header on one side in an up and down direction of the first tube group flows through the first tube group and flows into the header on another side in the up and down direction of the first tube group, the heating medium flown from the header on the other side in the up and down direction of the first tube group into a part of the header on the one side in the up and down direction of the second tube group flows through a part of the second tube group and flows into the header on the other side in the up and down direction of the second tube group, the heating medium flown into the header on the other side in the up and down direction of the second tube group flows through another part of the second tube group and flows into another part of the header on the one side in the up and down direction of the second tube group, the heating medium flown into the other part of the header on the one side in the up and down direction of the second tube group flows into the header on the one side in the up and down direction of the third tube group, the heating medium entered into the header on the one side in the up and down direction of the third tube group flows through the third tube group and flows into the header on the other side in the up and down direction of the third tube group, and the heating medium flows out from one end side in the axial direction of the header on the other side in the up and down direction of the third tube group.

* * * * *